United States Patent
Jackson et al.

(10) Patent No.: US 9,661,952 B2
(45) Date of Patent: May 30, 2017

(54) SANDWICH MAKING APPLIANCE AND METHOD OF MAKING A SANDWICH WITH THE SAME

(71) Applicant: Hamilton Beach Brands, Inc., Glen Allen, VA (US)

(72) Inventors: David L Jackson, Mechanicsville, VA (US); Michael Garman, Moseley, VA (US); Derek A McCullough, Henrico, VA (US); George Stamper, Quinton, VA (US); Claire Ashley, New York, NY (US); Mark C. Steiner, Midlothian, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 15/152,945

(22) Filed: May 12, 2016

(65) Prior Publication Data

US 2016/0255996 A1    Sep. 8, 2016

Related U.S. Application Data

(62) Division of application No. 13/740,594, filed on Jan. 14, 2013.

(51) Int. Cl.
*A47J 37/06* (2006.01)
*A23L 1/00* (2006.01)

(52) U.S. Cl.
CPC ......... *A47J 37/0611* (2013.01); *A23L 1/0067* (2013.01); *A23V 2002/00* (2013.01)

(58) Field of Classification Search
CPC .. A47J 37/0611; A47J 37/0629; A47J 37/049; A47J 37/043; A47J 2037/0617; A23L 1/01; A23V 2002/00
USPC .... 219/395, 402, 381, 331, 386, 432, 450.1, 219/496, 681, 403, 404, 453.12, 453.13, 219/454.11, 456.1, 462.1, 465.1, 468.1, 219/468.2; 99/331, 340, 349, 395, 403, 99/410, 495, 381, 367, 390, 379, 374, 99/376, 377, 380; 426/119, 523, 232
See application file for complete search history.

(56) References Cited

U.S. PATENT DOCUMENTS

| | | | | |
|---|---|---|---|---|
| 1,648,335 A | * | 11/1927 | Cole | A47J 37/0611 99/374 |
| 2009/0139412 A1 | * | 6/2009 | Zhan | A47J 37/0611 99/374 |

* cited by examiner

*Primary Examiner* — Hung D Nguyen
(74) *Attorney, Agent, or Firm* — Alexander D. Raring

(57) ABSTRACT

A small cooking appliance comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positionable between the top and bottom cooking surfaces when the top housing is in its closed position. The ring assembly comprises a top ring, a bottom ring, and an optional center cooking plate. The center cooking plate is movable between (i) a closed position in which a space defined by the ring assembly is divided into top and bottom cooking cavities and (ii) an open position.

2 Claims, 9 Drawing Sheets

SANDWICH MAKING APPLIANCE AND METHOD OF MAKING A SANDWICH WITH THE SAME

FIELD OF THE INVENTION

The present invention relates generally to appliances, and more particularly to small cooking appliances.

BACKGROUND OF THE DISCLOSURE

Hot sandwiches, particularly breakfast sandwiches, are popular food items, whether ordered in a restaurant or made at home. Hot sandwiches may include multiple different individual filling components layered between two pieces of bread. For example, a hot breakfast sandwich can be made from English muffins, bagels, pancakes, waffles, or the like. The filling components for hot sandwiches vary greatly. Typical filling components of a breakfast sandwich could include ham, bacon, Canadian bacon, sausage patties, vegetables, cheese, egg, and the like and various combinations thereof.

Making hot sandwiches at home, particularly breakfast sandwiches, can be a complicated and time-consuming task. Multiple appliances must be used to separately prepare the individual components, which are then assembled into a complete sandwich. For example, a toaster may be used to toast the English muffin and a microwave may be used to heat pre-cooked ham. A skillet or griddle appliance or the same on a stovetop appliance might be required to cook the egg. The use of multiple appliances causes difficulty coordinating the preparation of the individual components to ensure that all the individual components are done and ready at about the same time, thereby resulting in a complete sandwich in which all components are properly cooked and at desired temperatures. Moreover, the process of cleaning the various appliances adds additional time, frustration, and complexity to the home cooking process.

It has heretofore not been discovered how to create a kitchen appliance that is capable of preparing a hot sandwich whereby all the components are heated, toasted, and/or cooked so that a fully assembled sandwich is presented to a user. The appliance of the following disclosure accomplishes the above and other objectives and overcomes at least the above-described disadvantages of conventional kitchen appliances and methods of making hot sandwiches.

BRIEF SUMMARY OF THE DISCLOSURE

A kitchen appliance for preparing, assembling, and warming/cooking a hot sandwich is disclosed herein. In one embodiment of the subject appliance, the sandwich making appliance comprises a bottom housing, a top housing, and a ring assembly. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate. The center cooking plate is movable between (i) a closed position in which a space defined by the ring assembly is divided into distinct top and bottom cooking cavities and (ii) an open position. The top cooking cavity is formed by the top cooking surface, the top ring, and the center cooking plate when the top housing and the center cooking plate are in their respective closed positions. The bottom cooking cavity is formed by the bottom cooking surface, the bottom ring, and the center cooking plate when the bottom ring and the center cooking plate are in their respective closed positions.

In one or more embodiments, the ring assembly may be selectively movably attached to the bottom housing to enable the ring assembly to move between a closed position and an open position. The top ring may be selectively movably attached to the bottom housing to enable the top ring to move between a closed position and an open position. The bottom ring may be selectively movably attached to the bottom housing to enable the bottom ring to move between a closed position and an open position. The top ring may be adapted to move independently of the top housing and independently of the bottom ring. The bottom ring may be adapted to move independently of the top housing and independently of the top ring.

The center cooking plate may be pivotably attached to at least one of the top ring and the bottom ring. The center cooking plate may be moveable between its open position and its closed position while the top and bottom rings are in their respective closed positions. When the center cooking plate is in its open position, at least a portion of the center cooking plate may remain between the top and bottom rings while the top and bottom rings are in their respective closed positions.

In at least one embodiment, the ring assembly may further comprise an open position stop guide to limit the movement of the center cooking plate so that when the center cooking plate may be in its open position, at least a portion of the center cooking plate remains between the top and bottom rings. The ring assembly may further comprise at least one spacer element to maintain a desired spacing between the top and bottom rings while the top and bottom rings are in their respective closed positions. The ring assembly may further comprise a closed position stop guide, such that the center cooking plate engages the closed position stop guide when the center cooking plate is in the closed position such that the center cooking plate fully overlaps a bottom open end of the top ring and a top open end of the bottom ring.

The ring assembly may be removably attached to the bottom housing at a hinge point. The ring assembly may comprise a hinge pin about which the top and bottom rings hinge, the hinge pin having opposing ends that have different diameters. The hinge point may comprise opposing channels for receiving opposing ends of the hinge pin, the opposing channels having different sizes corresponding to the different diameters of the opposing ends of the hinge pin. The opposing channels may be angled relative to a plane of the top cooking surface when the top housing is in its closed position such that the ring assembly cannot be removed from the hinge point when the top housing is in the closed position.

The appliance may further comprise one or more heating elements in at least one of the top housing and the bottom housing to heat at least one of the top cooking surface and the bottom cooking surface. When the top housing is in a closed position, contact may be maintained between (i) the bottom cooking surface and the bottom ring, (ii) the bottom ring and the center cooking plate, (iii) the center cooking plate and the top ring, and (iv) the top ring and the top cooking surface.

The appliance may further comprise a plurality of handles separately affixed to each of the top housing, the top ring, and the bottom ring to enable a user to independently move the top housing, the top ring, and the bottom ring. To reduce heat transfer from the cooking surfaces, at least one of the plurality of handles has one or more through-holes defined therein. One or more of the plurality of handles may also be of a hollow construction to increase air space and further reduce heat transfer from the heating elements. The appliance may further comprise a handle affixed to the center cooking plate to enable a user to slide or pivot the center cooking plate.

In addition to the sandwich making appliance, as described above, other embodiments of the invention are directed to a method for cooking a food item comprising a plurality of layers. Such a method comprises (1) placing at least a first layer of the food item into a bottom cooking cavity, the bottom cooking cavity being positioned above a bottom cooking surface; (2) placing at least a second layer of the food item into a top cooking cavity and onto a movable cooking plate, the top cooking cavity being positioned above the bottom cooking cavity and separated from the bottom cooking cavity by the movable cooking plate; (3) moving a top cooking surface to a closed position above the top cooking cavity; and (4) moving the movable cooking plate to a position in which the movable cooking plate is no longer separating the top cooking cavity from the bottom cooking cavity. The method may further comprise heating at least one of the top cooking surface and the bottom cooking surface; and heating the movable cooking plate by way of conductive heat transfer from the at least one of the top cooking surface and the bottom cooking surface.

In one alternative embodiment of the invention, an appliance for cooking a food item comprises a bottom housing, a top housing, a ring assembly, a top ring, a bottom ring, and a center cooking plate. The bottom housing has a top surface that forms a bottom cooking surface of the appliance. The top housing has a bottom surface that forms a top cooking surface of the appliance. The top housing is movably attached to the bottom housing and moveable between a closed position and an open position. The ring assembly is positioned between the top and bottom cooking surfaces when the top housing is in its closed position. The ring assembly comprises a top ring, a bottom ring, and a center cooking plate. The top ring is selectively movably attached to the bottom housing to enable the top ring to move between a closed position and an open position. The bottom ring is selectively movably attached to the bottom housing to enable the bottom ring to move between a closed position and an open position. The center cooking plate is movable between (i) a closed position in which a space defined by the ring assembly is divided into top and bottom cooking cavities and (ii) an open position. The top cooking cavity is formed by the top cooking surface, the top ring, and the center cooking plate when the top housing and the center cooking plate are in their respective closed positions. The bottom cooking cavity is formed by the bottom cooking surface, the bottom ring, and the center cooking plate when the bottom ring and the center cooking plate are in their respective closed positions. The top ring is adapted to move independently of the top housing and independently of the bottom ring. The bottom ring is adapted to move independently of the top housing and independently of the top ring. The center cooking plate is moveable between its open position and its closed position while the top and bottom rings are in their respective closed positions.

The center cooking plate may be pivotably attached to at least one of the top ring and the bottom ring. When the center cooking plate is in its open position, at least a portion of the center cooking plate may remain between the top and bottom rings while the top and bottom rings are in their respective closed positions. The ring assembly may further comprise at least one spacer element to maintain a desired spacing between the top and bottom rings while the top and bottom rings are in their respective closed positions.

The ring assembly may be removably attached to the bottom housing at a hinge point. The ring assembly may comprise a hinge pin about which the top and bottom rings hinge. The hinge pin may have opposing ends having different diameters. The hinge point may comprise opposing channels for receiving opposing ends of the hinge pin. The opposing channels may have different sizes corresponding to the different diameters of the opposing ends of the hinge pin.

The opposing channels may be angled relative to a plane of the top cooking surface when the top housing is in its closed position such that the ring assembly cannot be removed from the hinge point when the top housing is in the closed position.

BRIEF DESCRIPTION OF THE SEVERAL VIEWS OF THE DRAWING(S)

Having thus described the invention in general terms, reference will now be made to the accompanying drawings, which are not necessarily drawn to scale. The foregoing summary, as well as the following detailed description of the disclosure, will be better understood when read in conjunction with the appended drawings. It should be understood, however, that the disclosure is not limited to the precise arrangements and instrumentalities shown, wherein:

DETAILED DESCRIPTION OF THE DISCLOSURE

Figure 1:
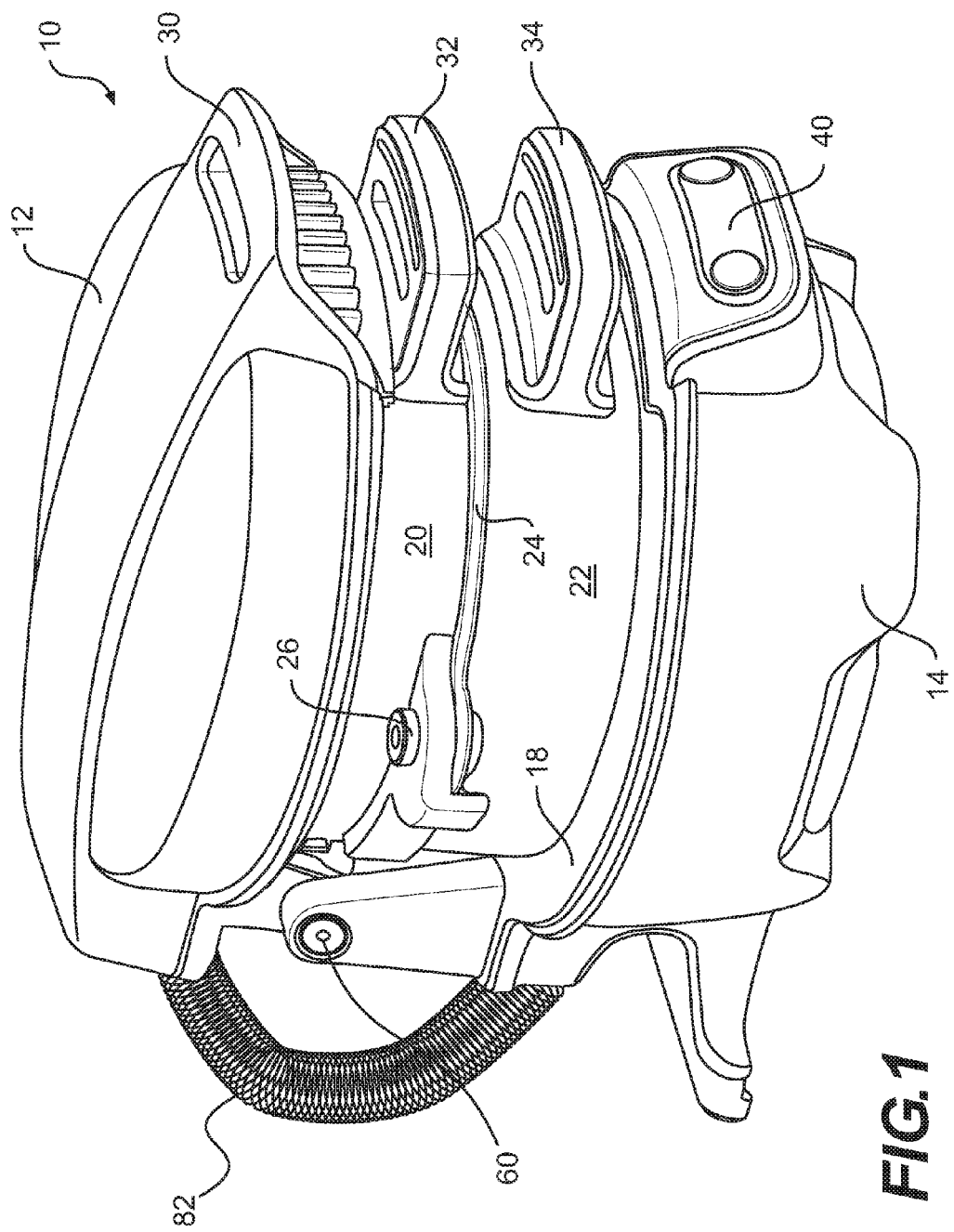
FIG. 1 is an isometric view of a sandwich making appliance, in accordance with embodiments of the present invention.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of appliance disclosed herein provide a sandwich making appliance that enables a user to easily and efficiently assemble and cook a sandwich (or any suitable food item) and then easily remove the fully assembled and cooked sandwich from the appliance. Advantageously, the appliance is able to apply heat to cook an individual filling components that is within (i.e., makes up one of the internal layers of) the sandwich. The appliance decreases the frustration, complexity, and time of individually assembling such a sandwich. Further, among other benefits, the appliance is easy to clean relative to the traditional approach of individually cooking, heating, and/or toasting the individual components of the sandwich.

Referring now to FIGS. 1-6 wherein like numerals indicate like elements throughout, there is illustrated a kitchen appliance 10 in accordance with an embodiment of the present disclosure. Appliance 10 comprises top housing 12 and bottom housing 14. Top housing 12 is movably attached to bottom housing 14, such that the top housing is movable between a closed or down position (illustrated in FIGS. 1, 4, and 5) and an open or up position (illustrated in FIGS. 2, 3, and 6). In the illustrated embodiment, top housing 12 is hingedly attached to bottom housing 14. However, any suitable movable attachment structure or method may be used to attach top housing 12 to bottom housing 14, such as pivotal or prismatic. Top housing 12 has a bottom surface that forms a top cooking surface 16 of the appliance. Bottom housing 14 has a top surface that forms a bottom cooking surface 18 of the appliance. Top cooking surface 16 and bottom cooking surface 18 are typically substantially planar and typically comprise a conductive metal with a non-stick coating. In operation, top surface 16 and bottom surface 18 are heated by one or more heating elements located, respectively, in the top and bottom housing (described further below).

Figure 3:
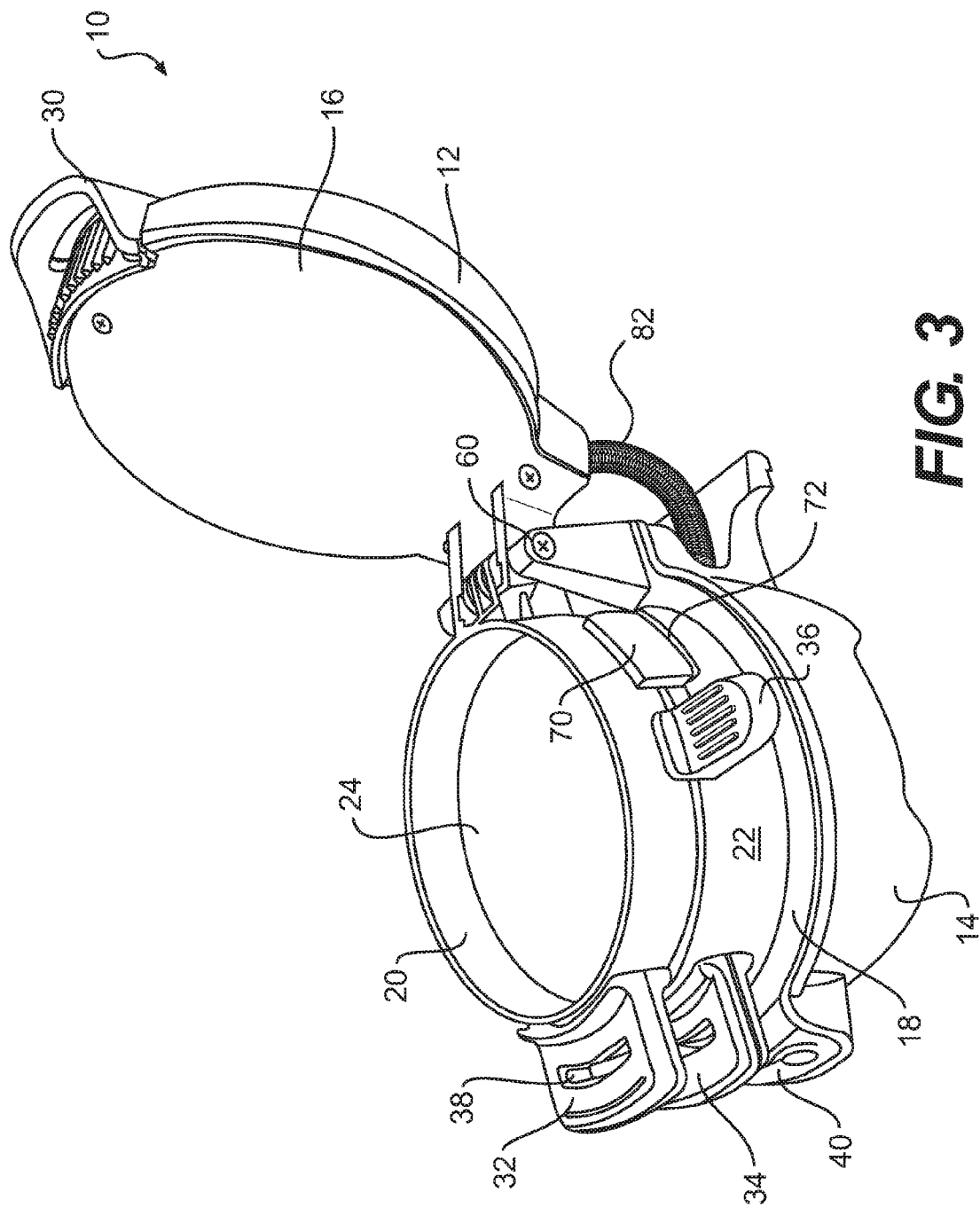
Figure 4:
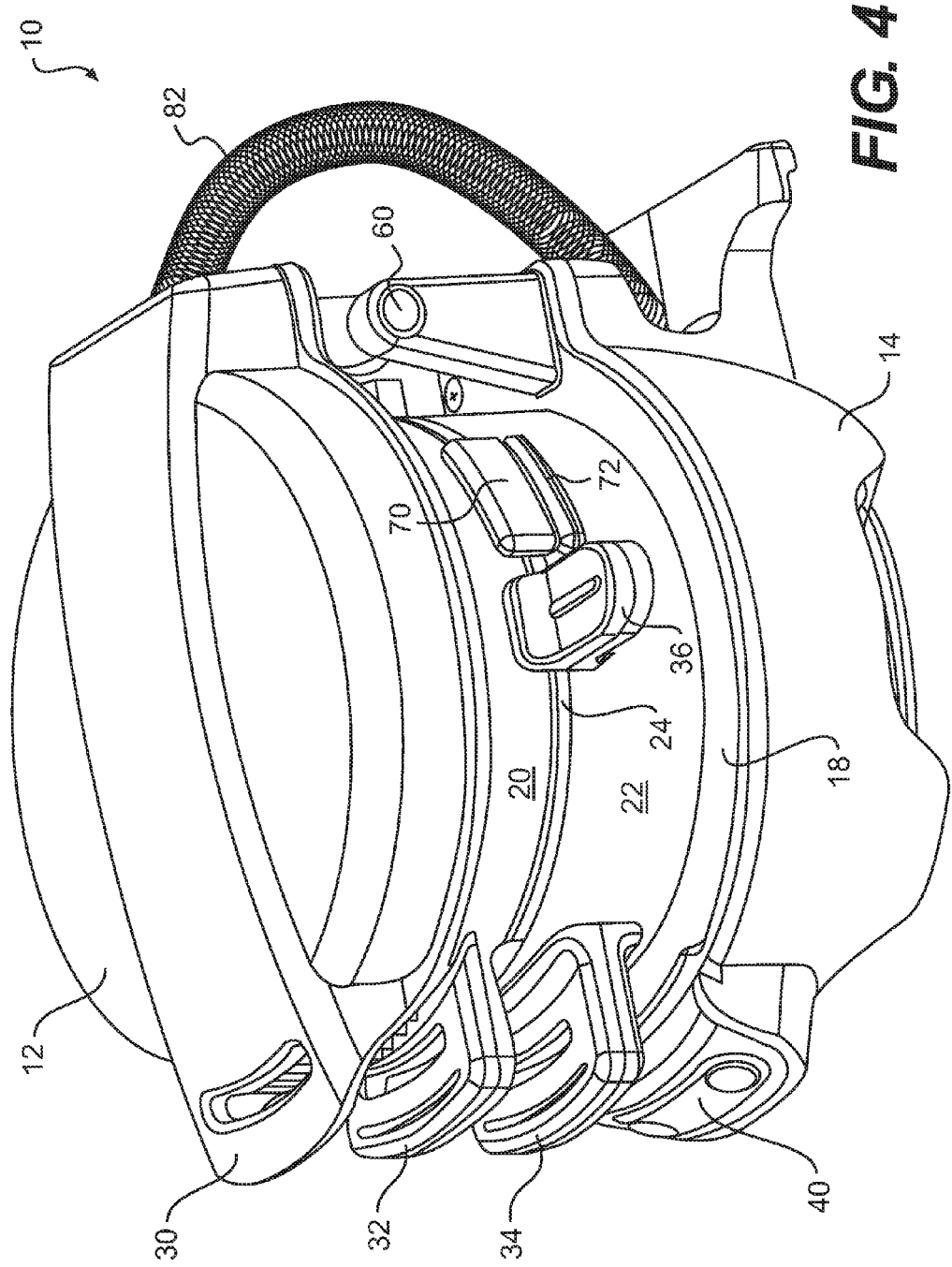
Figure 6:
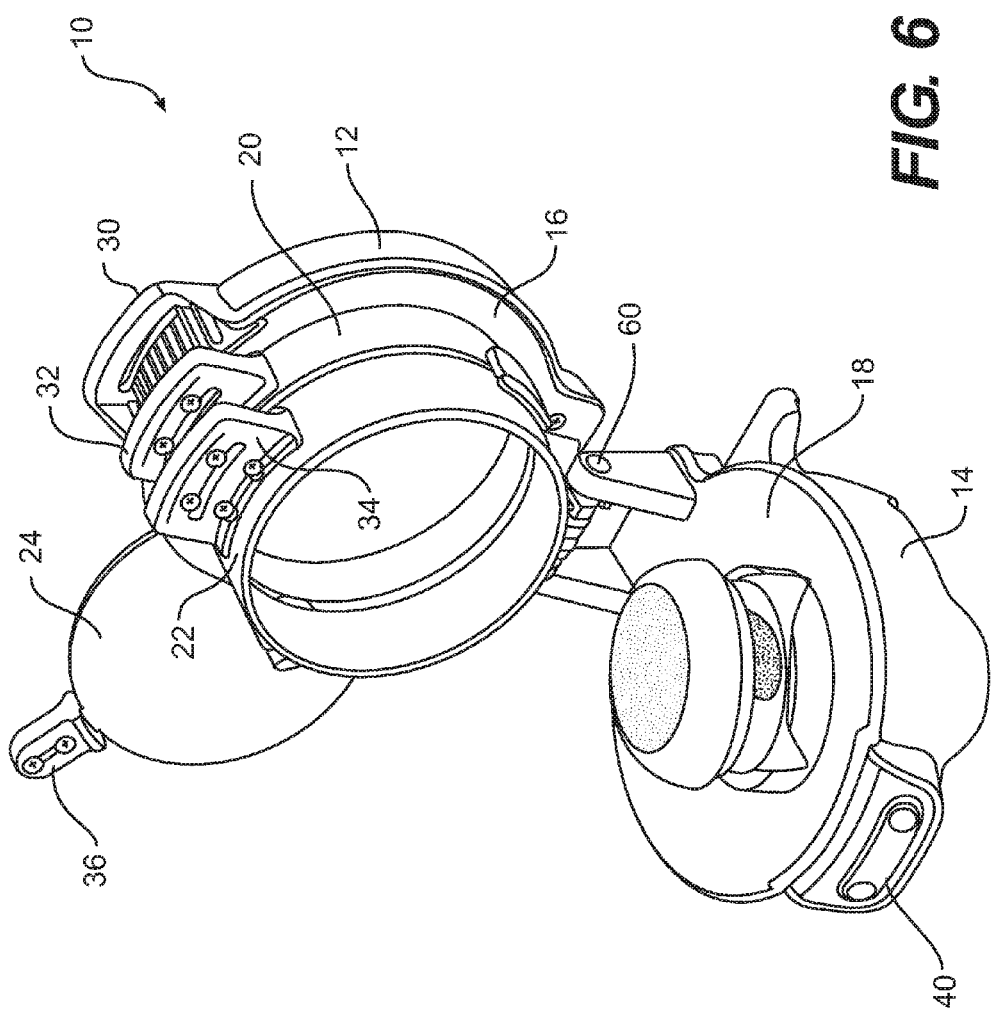

Appliance 10 further comprises a ring assembly that is positioned between the top and bottom cooking surfaces when the top housing is in the closed position. The ring assembly of the illustrated embodiment comprises top ring 20, bottom ring 22, and center cooking plate 24. In an embodiment illustrated herein, top ring 20 and bottom ring 22 are movably attached to each other (see FIG. 9). The ring assembly may be selectively movably attached to the bottom housing, such that the ring assembly is movable in its entirety between a closed position (the ring assembly being entirely closed is illustrated in FIGS. 1, 3, and 4) and an open position (the ring assembly being entirely open is illustrated in FIG. 6). In the illustrated embodiment, the ring assembly (including top ring 20 and bottom ring 22) is hingedly attached to bottom housing 14. However, any suitable movable attachment structure or method may be used to attach the ring assembly (including top ring 20 and bottom ring 22) to bottom housing 14, such as pivotal or prismatic. The ring assembly may be movable independently of the top housing. In an alternative embodiment of the invention, the ring assembly may sit upon the bottom cooking surface when in use and be sandwiched between the bottom and top cooking surfaces when the top housing is closed but be otherwise unattached to appliance 10.

In one embodiment, top ring 20 and bottom ring 22 are together selectively movably attached to bottom housing 14. This configuration enables top ring 20 to be movable between a closed position (see FIGS. 1, 3, 4, and 5) and an open position (illustrated in FIGS. 2 and 6). Similarly, bottom ring 22 is movable between a closed position (illustrated in FIGS. 1-5) and an open position (see FIG. 6). The top ring may be moveable independently of the top housing and independently of the bottom ring, and the bottom ring may be movable independently of the top housing and independently of the top ring. In the illustrated embodiments, all of top housing 12, top ring 20, and bottom ring 22 are hingedly attached at a common hinge point 60.

In an alternative embodiment, the top ring and the bottom ring may not be movably attached to each other but only to the bottom housing. In the alternative embodiment discussed above, in which the ring assembly is not attached to appliance 10, the top and bottom rings would not be movably attached to the bottom housing. In such an embodiment, the top and bottom rings may be movably attached to each other, may be pivotably attached to each other, may be attached to each other is any other suitable manner, or may be in contact but otherwise not be attached to each other at all. In such an embodiment in which the top and bottom rings are not attached to each other or to the bottom housing, the top ring may be stackable on the bottom ring. Appropriate guides or other structure may be present on the top and/or bottom rings to help maintain the rings in such a stacked configuration.

Figure 5:
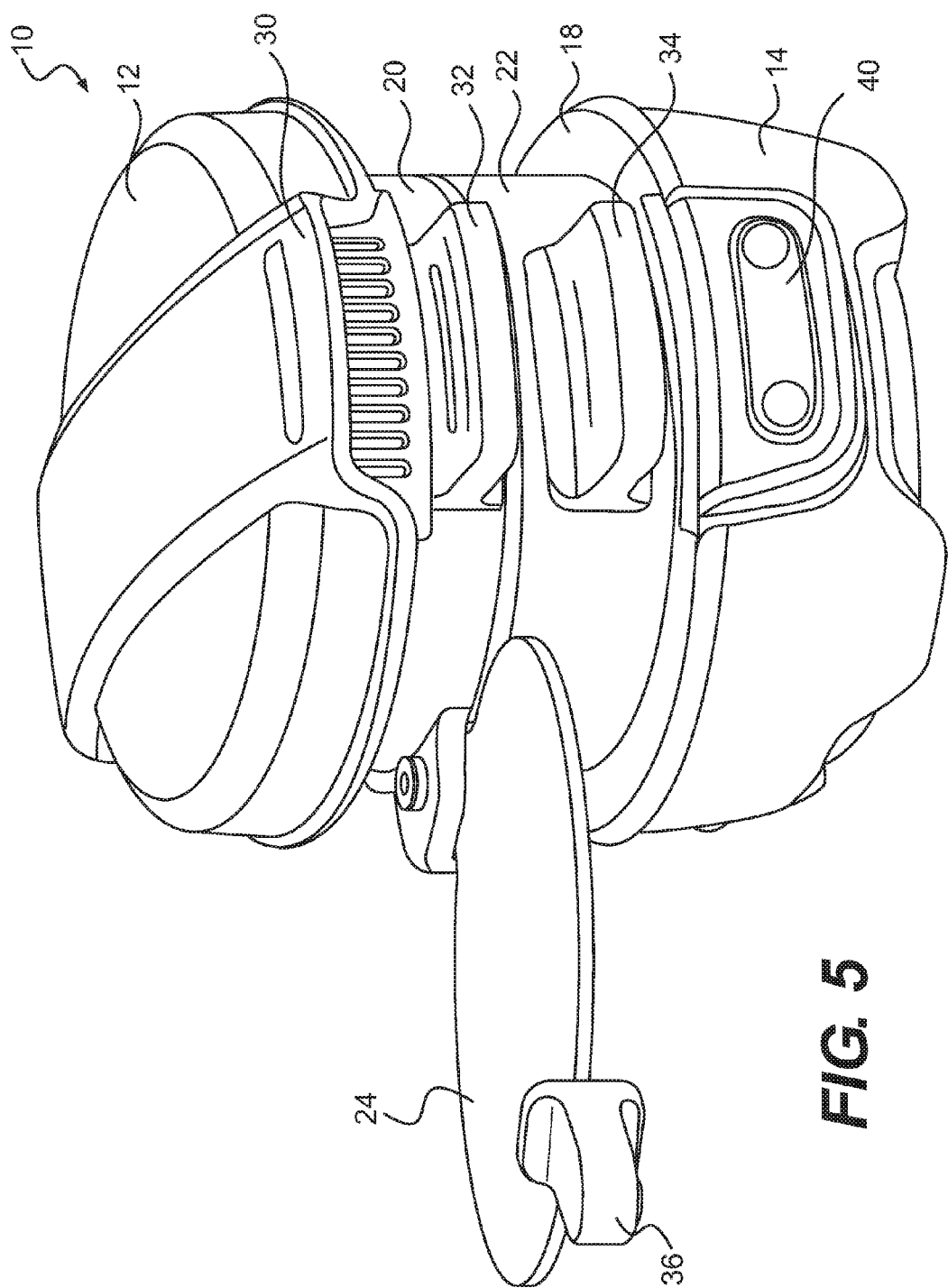

Center cooking plate 24 is movable between a closed position and an open position. Center cooking plate's closed position is most broadly defined by a position wherein center cooking plate 24 overlaps the circumference of at least one of top ring 20 or bottom ring 22 (see FIG. 2). In the closed position of center cooking plate 24, when top ring 20 and bottom ring 22 are also in their respective closed positions, center cooking plate 24 is positioned between the top and bottom rings 20, 22 (see FIGS. 1, 3 and 4). The open position of center cooking plate 24 is where center cooking plate 24 does not entirely overlap the circumference of at least top ring 20 or bottom ring 20 or where some or all of center cooking plate 24 is not positioned between the top and bottom rings 20, 22 (see FIGS. 5 and 6). In one embodiment, center cooking plate 24 is pivotably movable between its open position and its closed position. Alternatively, center cooking plate 24 may be slidably movable between its open position and its closed position. Advantageously, center cooking plate 24 is movable between its open position and its closed position while the top and bottom rings are in their respective closed positions. In the embodiment of FIG. 5, where the top and bottom rings are in their respective closed positions and the center cooking plate in its open position, center cooking plate 24 is pivotably attached to top ring 20 at a pivot point 26. It is possible to pivot center cooking plate 24 about pivot point 26 to center cooking plate's closed position without displacing top or bottom rings 20, 22. Alternatively, center cooking plate 24 may be pivotably attached to bottom ring 22 at a pivot point (not shown).

Top and bottom cooking surfaces 16, 18 selectively form, along with the ring assembly, top and bottom cooking cavities. The top cooking cavity is formed by the top cooking surface 16, the top ring 20, and the center cooking plate 24 when each are properly positioned (see, e.g., FIGS. 1 and 2). For example, the top cooking cavity exists when the top housing and the center cooking plate are in their respective closed positions. The bottom cooking cavity is formed by the bottom cooking surface 18, the bottom ring 22, and the center cooking plate 24 when each are properly positioned. For example, the bottom cooking cavity exists when the bottom ring and the center cooking plate are in their respective closed positions and the center cooking plate is positioned parallel to the bottom cooking surface (see, e.g., FIGS. 1 and 3).

Appliance 10 may comprise a handle 30 affixed to top housing 12, a handle 32 affixed to top ring 20, and a handle 34 affixed to bottom ring 22. These separate and independent handles enable a user to independently move the top housing, the top ring, and the bottom ring. Appliance 10 may further comprise a handle 36 affixed to center cooking plate 24 to enable a user to slide or pivot center cooking plate 24 relative to the top or bottom rings 20, 22. One or more of the handles 30, 32, 34, 36 may have one or more through-holes 38 defined therein to inhibit heat transfer to the portion of the handle that a user would grasp. Handles 30, 32, 34, 36 may also comprise a hollow construction to further insulate the handles. Latches (not illustrated) or other types of locking mechanisms may be included (such as in conjunction with top housing handle 30) to keep the appliance in a fully closed position during cooking.

Appliance 10 comprises display/control panel 40. Display/control panel 40 may comprise any desired combination of user input elements (e.g., buttons, switches, knobs, dials, etc.) to enable a user to control operation of appliance 10 and/or display elements (e.g., lights, alphanumeric displays, etc.) to provide information to a user. For example, display/control panel 40 may comprise a "power" light and a "preheat" light. As another example, display/control panel 40 may comprise any suitable means for turning the appliance on and off (e.g., a simple on/off switch) and/or for controlling the cooking time (e.g., a timed on/off switch). Alternatively, on/off switches and the like may be omitted and the appliance may be turned on and off simply by plugging in and unplugging the appliance from a power source. Further, display/control panel 40 may comprise a timer (electromechanical or digital) that simply times the cooking of the food item but does not control power to the appliance.

The ring assembly of appliance 10 may comprise at least one spacer element to maintain a desired spacing between the top and bottom rings. The desired spacing corresponds to the thickness of the center cooking plate. The spacing should be large enough to enable the center cooking plate to readily slide or pivot between its open position and its closed position while the top and bottom rings are in their respective closed positions and small enough to reduce the likelihood of food items (especially uncooked egg) inadvertently escaping when the center cooking plate is in its closed position. Specifically, as illustrated in FIG. 4, a spacer element top portion 70 is affixed to top ring 20 and a spacer element bottom portion 72 is affixed to bottom ring 22. The mounting positions of spacer element top portion 70 and spacer element bottom portion 72 are selected such that the portions engage when the top and bottom rings are in their closed positions and such that the desired spacing between the top and bottom rings is maintained when the center cooking plate is in its open position.

The ring assembly of appliance 10 may comprise a closed position stop guide to ensure that, when the center cooking plate is in its closed position, the center cooking plate properly overlaps a bottom open end of the top ring and a top open end of the bottom ring. Thus, the top and bottom cooking cavities are appropriately defined, and thus the likelihood of food items, such as uncooked egg or the like, inadvertently escaping when the center cooking plate is in its closed position is reduced. Spacer element top portion 70 can function as the closed position stop guide. For example, handle 36 of the center cooking plate 24 could contact spacer element top portion 70 when center cooking plate 24 is in its fully closed position.

Figure 7:
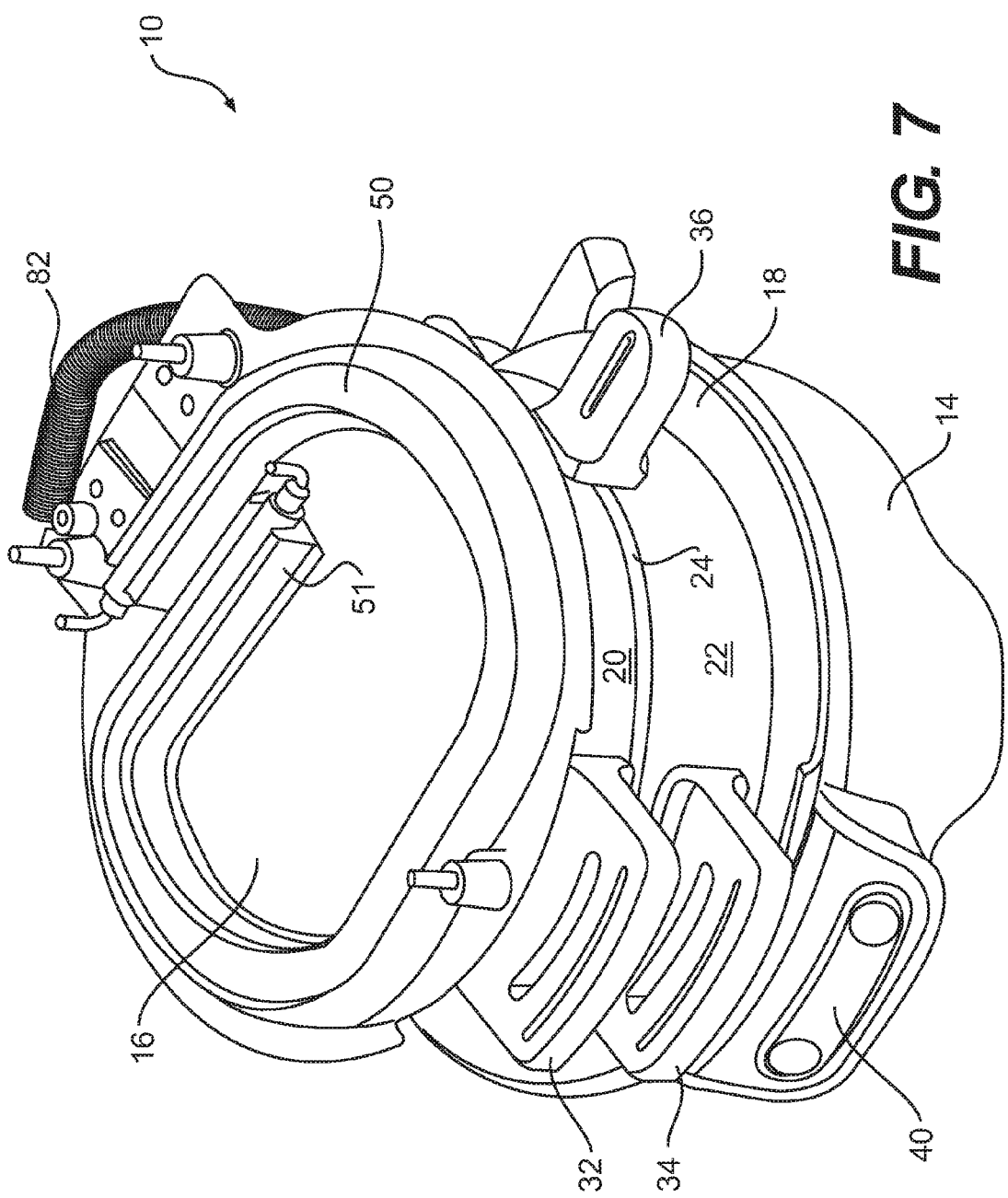
FIG. 7 is an isometric view of the sandwich making appliance of FIG. 1, with a portion of the top housing removed to illustrate internal components.

FIG. 7 is an isometric view of the sandwich making appliance of FIG. 1, with a portion of the top housing removed to illustrate internal components. Appliance 10 may comprise one or more heating elements 50 in either the top housing, the bottom housing, or both. Heating element 50 may comprise any known type of heating element, such as a resistive heating element, that is capable of heating one or more of the top cooking surface and the bottom cooking surface. Heat sink 51 may be interposed between heating element 50 and the inner surface (i.e., the surface opposite the cooking surface) of top cooking surface 16. Such a heat sink aids conductive heat transfer between heating element 50 and top cooking surface 16. In an embodiment of the invention in which heating elements are provided in both the top and bottom housings, similar components would reside in the bottom housing of the appliance (not illustrated).

In an embodiment of the invention in which heating elements are provided in both the top and bottom housings, the top heating element will conductively heat the top cooking surface and the bottom heating element will conductively heat the bottom cooking surface. When the top housing is in a closed position, contact is maintained between (i) the bottom cooking surface and the bottom ring, (ii) the bottom ring and the center cooking plate, (iii) the center cooking plate and the top ring, and (iv) the top ring and the top cooking surface. As such, conductive heat transfer occurs from the top cooking surface and/or the bottom cooking surface to the top ring, the bottom ring, and the center cooking plate.

In an embodiment of the invention in which heating elements are provided in both the top and bottom housings, in addition to a power cord that goes from the bottom housing to a wall electrical outlet (not illustrated) to provide electrical power to the appliance, power cord 82 routes power from the bottom housing to the top housing to supply the top heating element.

Figure 8:
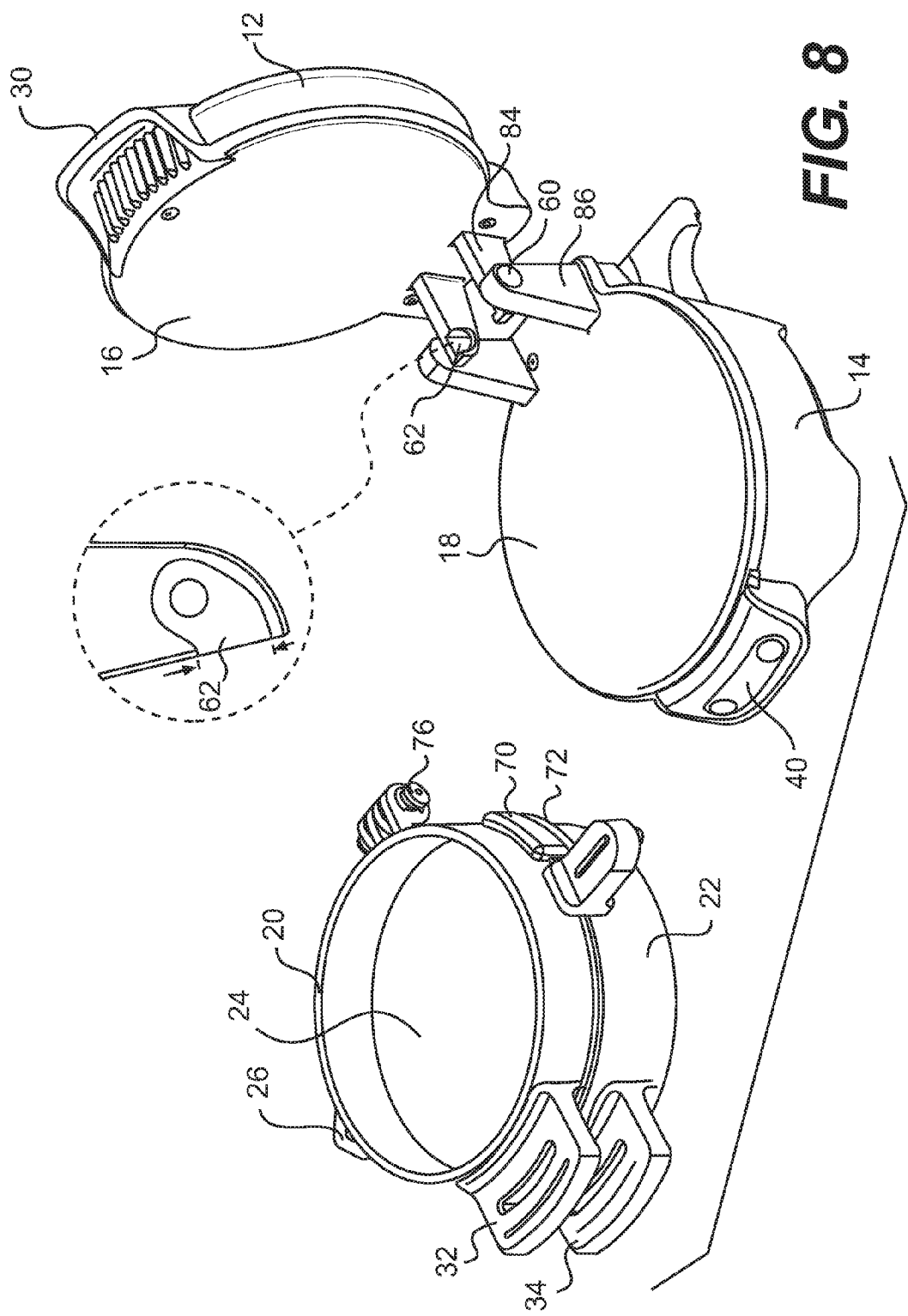
FIG. 8 is an isometric view of the sandwich making appliance of FIG. 1, with the ring assembly removed.

FIG. 8 is an isometric view of the sandwich making appliance of FIG. 1, with the ring assembly selectively removed. In this illustrated embodiment, the ring assembly is selectively removably affixed to the bottom housing and thus is removable as a unit (e.g., for cleaning) while the top housing remains movably attached to the bottom housing. Top housing 12 comprises two elongated top struts 84 that project substantially perpendicularly from top cooking surface 16. Similarly, bottom housing 14 comprises two elongated bottom struts 86 that project substantially perpendicularly from bottom cooking surface 18. Pivot point 60, about which top housing 12, top ring 20, and bottom ring 22 all commonly pivot, is formed where the distal ends of top struts 84 and bottom struts 86 meet or overlap. The elongated structure of the various struts enable the ring assembly to fit between the top and bottom housings and enables the top cooking surface to be substantially parallel to the bottom cooking surface when the top housing is in its closed position. A first hinge pin (not labeled) or similar mechanism hingedly joins the top and bottom struts on one side, and a second hinge pin (not labeled) or similar mechanism hingedly joins the top and bottom struts on the opposing side.

Top ring 20 and bottom ring 22 are hingedly attached to each other via hinge pin 76. As illustrated in FIG. 8, top struts 84 have opposing channels 62 for receiving opposing ends of hinge pin 76 therebetween when the ring assembly is selectively attached to appliance 10. Hinge pin 76 has opposing ends, each opposing end having a different diameter (see FIG. 9). The opposing channels each have a different width (the dimension described herein as the width of the channel is indicated by the arrows in the inset of FIG. 8) that correspond to one of the different diameters of the opposing ends of hinge pin 76. The different diameters of the opposing ends of hinge pin 76 and the corresponding different widths of opposing channels 62 would ensure that the ring assembly can only be attached to appliance 10 in one particular orientation, thereby ensuring the correct top/bottom orientation of the ring assembly within appliance 10.

With reference to the illustrated inset of FIG. 8, there is illustrated a close-up view of the distal end of one top strut 84, in the orientation strut 84 would be in when top housing 12 is in its closed position. As further illustrated in the inset of FIG. 8, channel 62 is angled upward when top housing 12 is in its closed position. Although not illustrated, the opposing channel has the same angle. When the ring assembly is attached to appliance 10 and top housing is in its closed position, the ends of hinge pin 76 are positioned in the upper ends of the respective channels. The ring assembly would be sandwiched between the upper and lower housings 12, 14. The ring assembly could only be removed by applying a force along a plane parallel to the top or bottom cooking surfaces 16, 18. Accordingly, if a user attempts to pull the ring assembly out of appliance 10 while top housing 12 is in its closed position (which may be while the food item is cooking), the angle of channels 62 would obstruct such movement such that that the ring assembly cannot be removed from the hinge point when the top housing is in its closed position.

Figure 9:
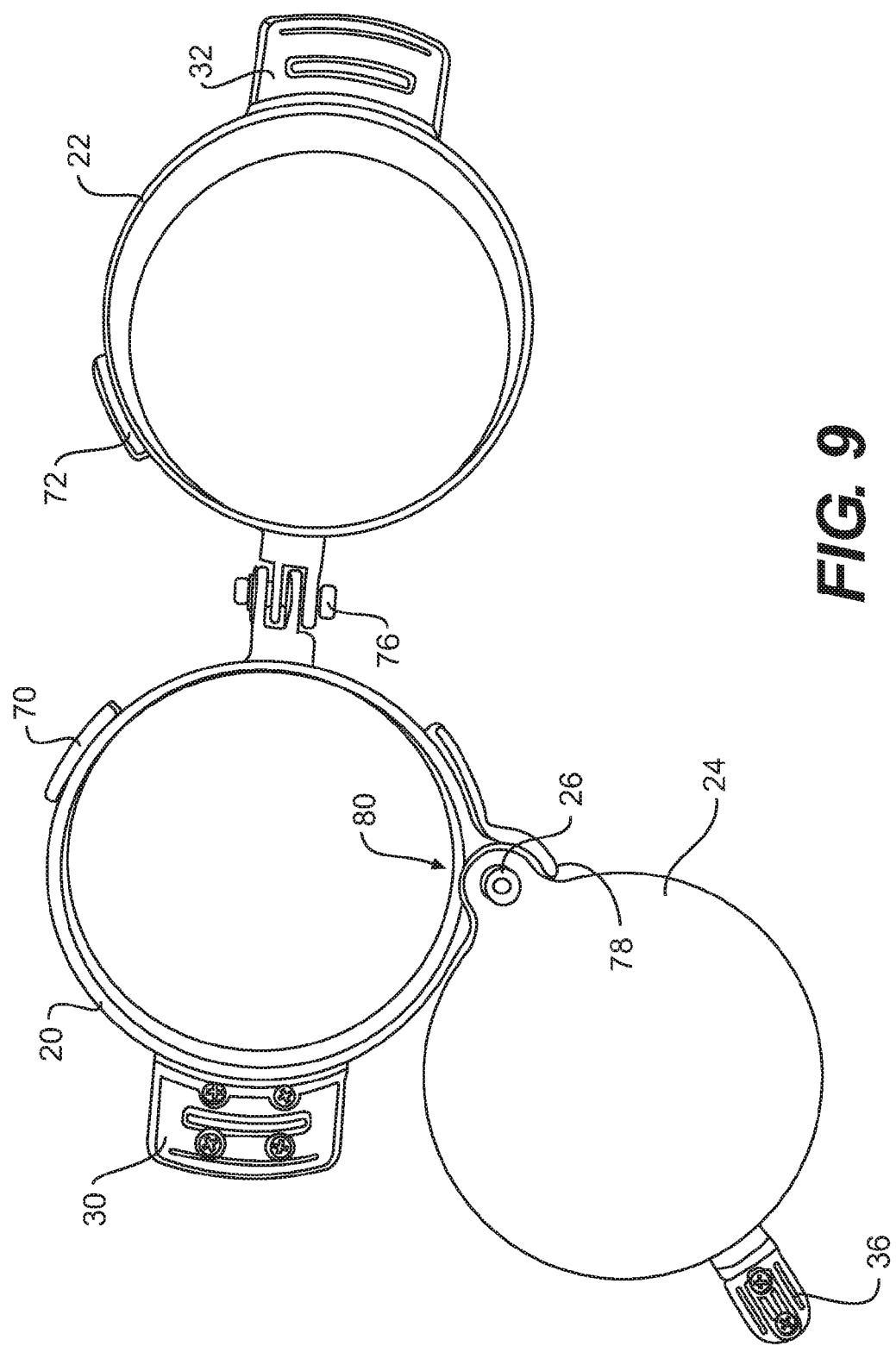
FIG. 9 is a top view of the ring assembly of the sandwich making appliance of FIG. 1, removed from the appliance.

FIG. 9 is a top view of the ring assembly only as removed from appliance 10, such as for cleaning. Top ring 20 and bottom ring 22 are open 180 degrees apart and center cooking plate 24 is pivoted open. The ring assembly may further comprise an open position stop guide 78, which is part of the structure that supports pivot point 26. Open position stop guide 78 defines and limits how far center cooking plate 24 can pivot. Specifically, open position stop guide 78 engages center cooking plate 24 to create a rotation limit. A portion of center cooking plate 24 contacts open position stop guide 78 (as illustrated in FIG. 9) such that the center cooking plate cannot pivot any further out. The size and shape of center cooking plate 24, the location of the pivot point, and the limit set by open position stop guide 78 all combine to ensure that, when center cooking plate 24 is in its open position, at least a portion of center cooking plate 24 remains between top and bottom rings 20, 22 when the rings are in their closed positions in appliance 10. This overlap, which is illustrated in FIG. 9 at 80, further helps to maintain the desired spacing between top and bottom rings 20, 22 or otherwise facilitates the ability to readily pivot center cooking plate 24 from its open position to its closed position while top and bottom rings 20, 22 are in their respective closed positions.

While top cooking surface 16 and bottom cooking surface 18 are described above as typically substantially planar, either or both of top cooking surface 16 and bottom cooking surface 18 may comprise one or more ridges, rims, bumps, or any other suitable projections to engage, respectively, with the bottom edge of bottom ring 22 and/or the top edge of top ring 20 to help restrict side-to-side or other movement of the ring assembly, especially during opening and closing of center cooking plate 24. Alternatively, either or both of top cooking surface 16 and bottom cooking surface 18 may comprise one or more channels, dimples, or any other suitable indentations to engage, respectively, with one or more corresponding ridges, rims, bumps, or other suitable projection(s) on bottom ring 22 and/or top ring 20. Such structure for engagement between the ring assembly and top and bottom cooking surfaces 16, 18 may be particularly desirable in an embodiment in which, as described above, the ring assembly is not attached to appliance 10 but merely rests on lower cooking surface 18. Further, either or both of top cooking surface 16 and bottom cooking surface 18 may be ridged or ribbed rather than planar.

The embodiments of the appliance illustrated herein has a generally round horizontal cross-sectional shape, which is well suited for preparing sandwiches made using round bread, such as English muffins and bagels. However, alternative embodiments of the appliance may have any other desirable horizontal cross-sectional shape. For example, one alternative embodiment of the appliance may have a generally square horizontal cross-sectional shape. Another alternative embodiment of the appliance may have a horizontal cross-sectional shape that resembles a standard slice of bread (i.e., three straight sides and one convex side).

A method for cooking a food item comprising a plurality of layers will now be described with reference to FIGS. 1-6. Typically, several minutes prior to beginning to cook the food item, appliance 10 is preheated. The preheating may occur with appliance 10 in the fully closed position, as illustrated in FIG. 1. Top and bottom cooking surfaces 16, 18 are heated, such as by heat element 50 of FIG. 7. When appliance 10 is in the fully closed position, heated top surface 16 and heated bottom surface 18 will transfer heat to top and bottom rings 20, 22, respectively, by way of conductive heat transfer. Top and bottom rings 20, 22 together heat the movable cooking plate 24 by way of conductive heat transfer. Appliance 10 may comprise an indicator light to indicate when the appliance has reached the desired preheat temperature. Such an indication may be based on an actual measured temperature within the appliance or may simply be time-based.

Figure 2:
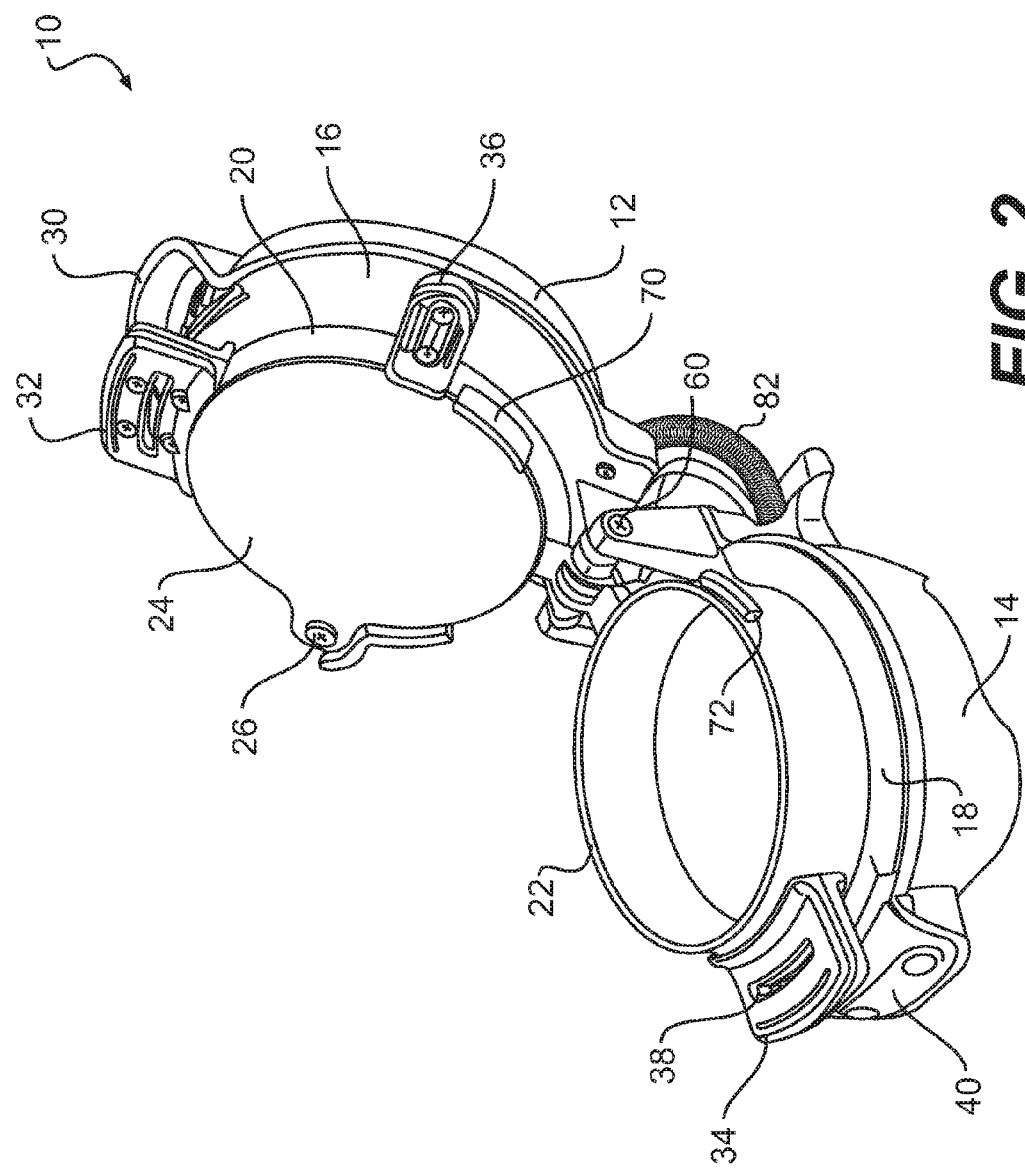
FIGS. 2-6 are isometric views of the sandwich making appliance of FIG. 1, illustrating various configurations of the appliance.

When the appliance is preheated, top housing 12 and top ring 20 are raised to their open positions and bottom ring 22 is kept closed, as illustrated in FIG. 2. A bottom layer of the food item is placed into bottom ring 22 such that the bottom layer sits on bottom cooking surface 18. Such a bottom layer may be, for example, one half of an English muffin. One or more additional layers may be placed on top of the bottom food layer. After the desired layers are placed into the bottom ring 22, top ring 20 (with the attached center cooking plate) is lowered into its closed position, as illustrated in FIG. 3. With the center cooking plate in its closed position, the bottom cooking cavity is now defined by bottom cooking surface 18, the bottom ring 22, and center cooking plate 24. Alternatively, where center cooking plate 24 is pivotally attached to bottom ring 22, the bottom cavity might be defined by rotating center cooking plate 24 to a closed position independently of lowering top ring 20.

Once center cooking plate 24 is in the closed position and top ring 20 is lowered, additional food layers may then be placed into top ring 20 such that the first additional food layer sits directly on the center cooking plate. Advantageously, because the center cooking plate is heated, this food layer may comprise a food item that requires cooking or heating, although such a food layer is not required. For example, an uncooked egg may be placed on center cooking plate 24. The heated center cooking plate can appropriately cook or heat the egg to food safe temperatures. One or more additional layers of food items may then be placed on top of the food layer that sits directly on center cooking plate 24. The top layer (i.e., the last layer to be placed into the top ring) may be, for example, the other half of the English muffin.

After all of the desired layers are placed into top ring 20, top housing 12 is lowered into its closed position, as illustrated in FIG. 4. With top housing 12 in its closed position, the top cooking cavity is now completely defined by top cooking surface 16, top ring 12, and center cooking plate 24. Appliance 10 is maintained in this fully closed position for a period of time to either toast the top or bottom layers or, if necessary, to enable any internal food item to be heated/cooked. The period of time may be predetermined, and the predetermination may be based on any one or more of several factors (e.g., the type of food item, the types and/or numbers of layers, the desired end temperature, user preferences, etc.). The appliance may track the cooking time and notify a user when the cooking time has elapsed, such as via a timer. Alternatively, a user may manually track the elapsed time from the closing of top housing 12.

After sufficient time has elapsed, center cooking plate 24 is moved to its open position in which the movable cooking plate 24 is no longer separating the top cooking cavity from the bottom cooking cavity, as illustrated in FIG. 5. Moving center cooking plate 24 from its closed position to its open position causes the layers in the top cooking cavity to separate from center cooking plate 24 such that they stack onto any food items in the bottom cooking cavity. Accordingly, the top food layers are assembled onto the food layers positioned in the bottom cooking cavity. Thus, a fully cooked sandwich is now assembled. Top housing 12, top ring 20, and bottom ring 22 are now raised into their respective open/upper positions, as illustrated in FIG. 6, such that the assembled sandwich may be readily removed from appliance 10.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A method for cooking a food item comprising a plurality of layers, the method comprising:
   placing at least a first layer of the food item into a bottom cooking cavity, the bottom cooking cavity being positioned above a bottom cooking surface;
   placing at least a second layer of the food item into a top cooking cavity and onto a moveable cooking plate, the top cooking cavity comprising a ring and the moveable cooking plate, the top cooking cavity being positioned above the bottom cooking cavity and separated from the bottom cooking cavity by the movable cooking plate;
   lowering a top cooking surface to a closed position above the top cooking cavity; and
   stacking the at least second layer of the food item onto the at least first layer of the food item by the step of pivoting the movable cooking plate relative to the top or bottom cooking cavities to a position in which the movable cooking plate is no longer separating the top cooking cavity from the bottom cooking cavity without raising the top cooking surface to an open position.

2. The method of claim 1, further comprising:
   heating at least one of the top cooking surface and the bottom cooking surface; and
   heating the movable cooking plate by way of conductive heat transfer from the at least one of the top cooking surface and the bottom cooking surface.

\* \* \* \* \*